April 25, 1933.　　　L. LEVINE　　　1,905,973
AUTOMOBILE COVER
Filed Aug. 22, 1932　　　2 Sheets-Sheet 1
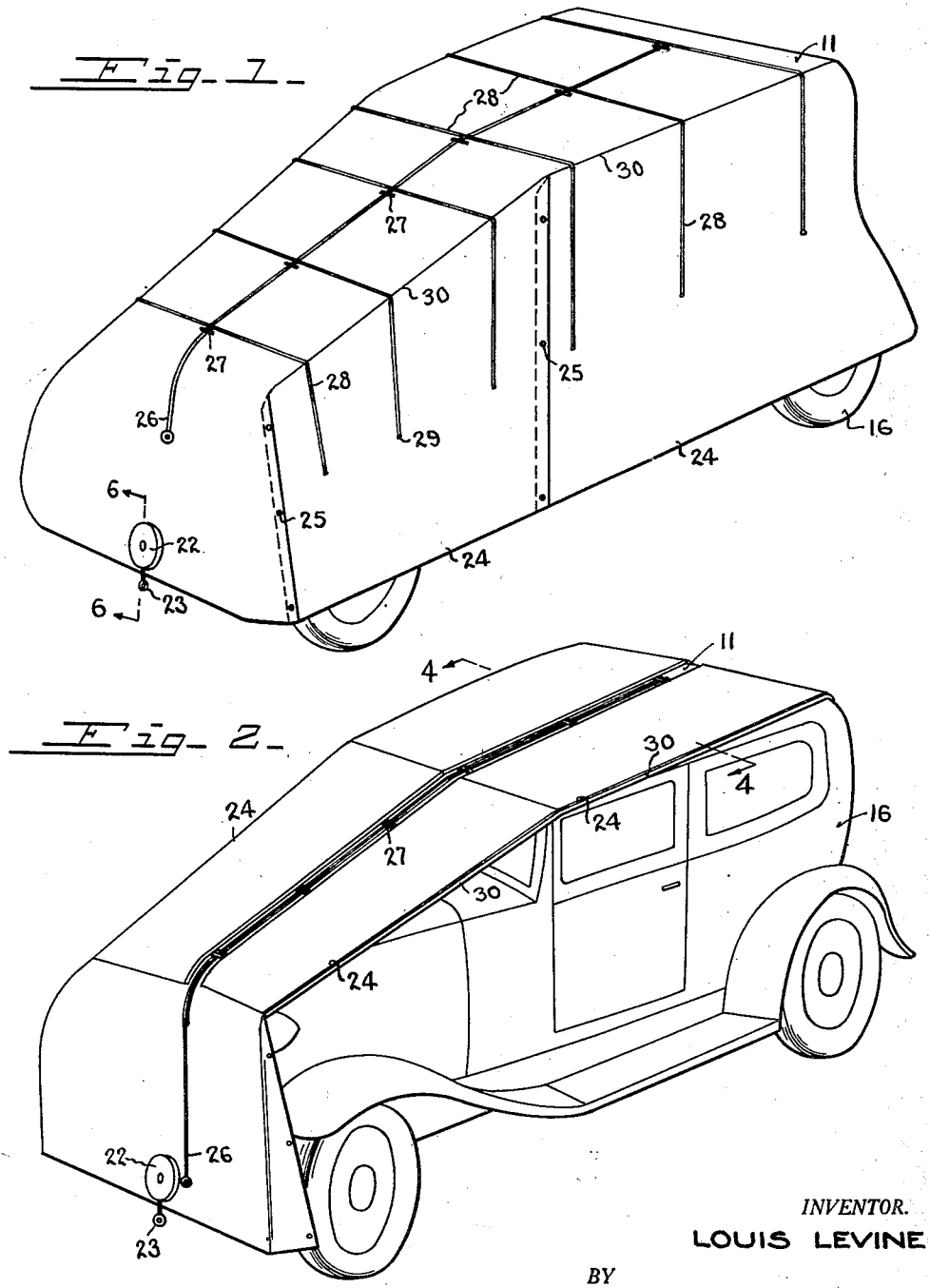
INVENTOR.
LOUIS LEVINE.
BY
*H.C. Kavel.*
ATTORNEY.

April 25, 1933.                L. LEVINE                 1,905,973
                            AUTOMOBILE COVER
                        Filed Aug. 22, 1932           2 Sheets-Sheet 2
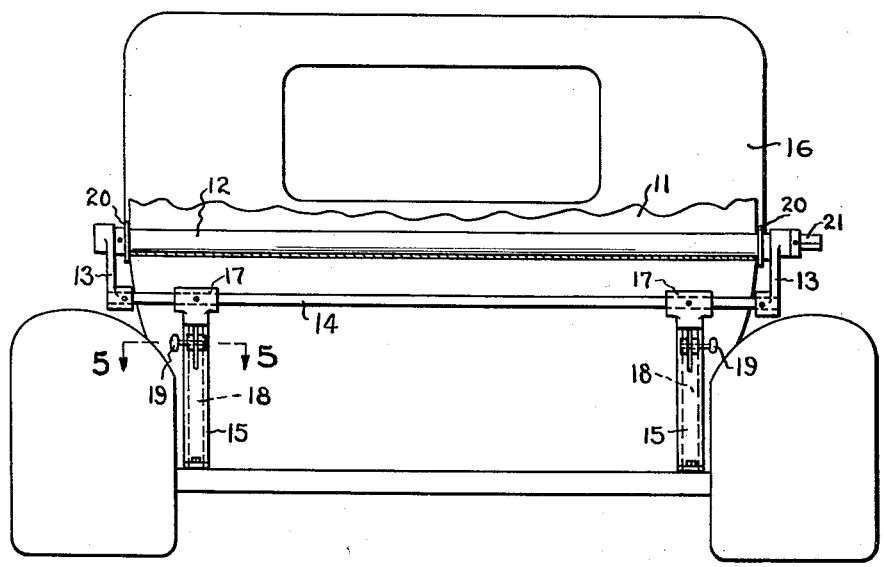
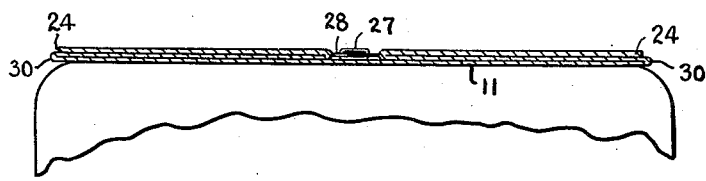
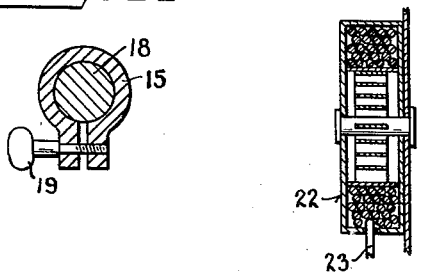
INVENTOR.
LOUIS LEVINE.
BY *H.C. Karel.*
ATTORNEY.

Patented Apr. 25, 1933

1,905,973

UNITED STATES PATENT OFFICE

LOUIS LEVINE, OF CINCINNATI, OHIO

AUTOMOBILE COVER

Application filed August 22, 1932. Serial No. 629,770.

My invention relates to a new and improved cover arranged to be extended over the body and fenders of an automobile to protect the automobile from the elements, when it is parked in the open. My covering is so arranged that it can easily be drawn over the automobile and removed therefrom by a single individual. The covering is rolled about a suitable roller in the rear of the car when not in use.

The object of my invention is to provide improved means for covering an automobile to protect the body and fenders from the elements.

A further object is to provide means for maintaining the covering in a uniform roll in the rear of the car.

A further object is to provide means for facilitating the drawing of the cover over the automobile.

A still further object is to provide means operable from one position for drawing up and folding the side flaps on the top of the car whereby the whole may be rolled about the roller.

My invention will be further readily understood from the following description and claims and from the drawings, in which latter:

Fig. 1 is a perspective view of an automobile with my improved cover thereover,

Fig. 2 is a similar view with the side flaps folded on the top,

Fig. 3 is a rear view of an automobile showing the roller and its mounting,

Fig. 4 is a detailed section, taken in the plane of the line 4—4 of Fig. 2,

Fig. 5 is a detailed section, taken in the plane of the line 5—5 of Fig. 3, and

Fig. 6 is a detailed section, taken in the plane of the line 6—6 of Fig. 1.

My improved cover 11 which is made of a suitable waterproof material is secured to a roller 12 rotatably mounted in brackets 13 secured to a cross shaft 14. A pair of supports 15 are suitably secured to the frame of the automobile 16. Extensions 17 provided with rods 18 received in the supports 15 are slidable therein and are secured to the cross shaft 14. Screws clamps 19 threaded into the supports 15 clamp the extensions 18 in any desired position. If it is desired to raise the roller, the clamps 19 are released and the roller unit is lifted upward to the desired position and the clamps 19 are then tightened to hold the roller unit in such position.

The roller 12 is provided with end flanges 20 arranged to guide the cover 11 onto the roll. The roller 12 is also provided with a square end extension 21 over which a suitable crank may be placed for rotating the roller.

Mounted at the forward end of the cover 11 is a spring reel 22 and assuming that the cover is entirely rolled about the roller 12 and it is desired to place the cover over the automobile the operator takes the cord 23 and draws it out of the reel 22 over the car to a position in front of the car at which position the cord will be fully extended and further pulling on the cord will cause the covering to unroll and be drawn over the car to a position such as is shown in Fig. 2. A spring in the reel 22 rewinds the cord when it is released. The operator then takes hold of the edges 24 of the side flaps and pulls them down into a position such as shown in Fig. 1. These side flaps are made in sections and are suitably secured together as by buttons or snaps 25 at their adjoining edges for completely encasing the automobile and protecting the same from the elements.

When it is desired to remove the cover from the car the snaps are released and a cord 26, which extends through guides 27 and has extensions 28 suitably secured to a central portion of the side flaps as at 29, is pulled for drawing the cord forward and drawing up on the extensions 28 for causing the side flaps to fold upwardly along the line 30 in overlapped relation with the edges 24 adjacent to the line 30 as shown in Figs. 2 and 4. The crank is then placed over the square extension 21 of the roller and rotated to roll the cover about the roller and into a convenient roll in the rear of the car. This roller may be suitably contained in a compartment in the rear of the car on the roller and its mounting may be a separate unit which can be positioned in the rear of the car if it is desired to use the covering at a specified location in place of a garage.

Having thus fully described my invention what I claim as new and desire to secure by Letters Patent, is:

1. A cover for an automobile consisting of a top and side flaps, means for folding said side flaps on said top and a roller for receiving said folded cover.

2. A cover for an automobile consisting of a top and side flaps, cords secured to said side flaps connected to a central cord for folding said side flaps on said top and a roller for receiving said folded cover.

3. A cover for an automobile consisting of a top and side flaps, means for securing said side flaps together, means for folding said side flaps on said top and a roller for receiving said folded cover.

4. A cover for an automobile consisting of a top and side flaps, means for securing said flaps together, cords secured to said side flaps connected to a central cord for folding said side flaps on said top and a roller for receiving said folded cover.

5. A cover for an automobile consisting of a top and side flaps, means for folding said flaps over said top from a forward position, means for rolling said folded cover on a roller and an extensible cord secured to the forward end of said cover for facilitating drawing said cover over said automobile.

6. A cover for an automobile consisting of a top and side flaps, cords secured to said side flaps connected to a central cord for folding said flaps over said top from a forward position, means for rolling said folded cover on a roller and an extensible cord secured to the forward end of said cover for facilitating drawing said cover over said automobile.

7. A cover for an automobile consisting of a top and side flaps, means for securing said flaps together, means for folding said flaps over said top from a forward position, means for rolling said folded cover on a roller and an extensible cord secured to the forward end of said cover for facilitating drawing said cover over said automobile.

8. A cover for an automobile consisting of a top and side flaps, means for securing said flaps together, cords secured to said side flaps connected to a central cord for folding said flaps over said top from a forward position, means for rolling said folded cover on a roller and an extensible cord secured to the forward end of said cover for facilitating drawing said cover over said automobile.

9. A cover for an automobile consisting of a top and side flaps, means for folding said flaps over said top from a forward position, a roller positioned in the rear of said automobile for reception of said cover when not in use and an extensible cord secured to the forward end of said cover for facilitating drawing said cover over said automobile.

In testimony whereof, I have hereunto signed my name.

LOUIS LEVINE.